United States Patent
Hama et al.

(10) Patent No.: US 6,922,268 B2
(45) Date of Patent: Jul. 26, 2005

(54) MULTI-BEAM SCANNING DEVICE

(75) Inventors: Yoshihiro Hama, Saitama-ken (JP); Masakazu Hirano, Tokyo (JP)

(73) Assignee: PENTAX Corporation, Tokyo (JP)

( * ) Notice: Subject to any disclaimer, the term of this patent is extended or adjusted under 35 U.S.C. 154(b) by 116 days.

(21) Appl. No.: 10/400,475

(22) Filed: Mar. 28, 2003

(65) Prior Publication Data

US 2003/0184833 A1 Oct. 2, 2003

(30) Foreign Application Priority Data

Apr. 1, 2002 (JP) ....................................... 2002-098350

(51) Int. Cl.$^7$ .............................................. G02B 26/08
(52) U.S. Cl. ..................................... 359/204; 347/233
(58) Field of Search ................................. 359/204, 206, 359/212, 216–218; 347/233, 241, 243, 244, 256, 258, 259

(56) References Cited

U.S. PATENT DOCUMENTS

| 5,220,450 A | 6/1993 | Iizuka |
| 6,198,562 B1 | 3/2001 | Hayashi et al. |
| 6,317,245 B1 * | 11/2001 | Hama et al. ................. 359/204 |
| 6,396,615 B1 | 5/2002 | Hama et al. |

FOREIGN PATENT DOCUMENTS

| JP | 2-35410 | 2/1990 |
| JP | 8-304722 | 11/1996 |
| JP | 9-146024 | 6/1997 |
| JP | 2000249948 | 9/2000 |

OTHER PUBLICATIONS

English Language Translation of JP Appln. No. 8–304722.
English Language Translation of JP Appln. No. 2–35410.
English Language Translation of JP Appln. No. 9–146024.

* cited by examiner

Primary Examiner—Mark A. Robinson
Assistant Examiner—Alessandro Amari
(74) Attorney, Agent, or Firm—Greenblum & Bernstein, P.L.C.

(57) ABSTRACT

There is provided a multi-beam scanning device including a first, a second and a third light emitting elements which emit a first, a second and a third light beams, respectively, and a prism unit through which the first, second and third light beams respectively emitted by the first, the second and the third light emitting elements pass. The prism unit includes at least two prisms being bonded to each other, a first reflective portion and a second reflective portion being formed on a surface on which said at least two prisms are bonded to each other. Further, the prism unit has a gap formed between the first reflective portion and the second reflective portion, the third beam emitted by the third light emitting element passing through the gap.

10 Claims, 9 Drawing Sheets

MULTI-BEAM SCANNING DEVICE

BACKGROUND OF THE INVENTION

The present invention relates to a multi-beam scanning device which Is configured to form simultaneously a plurality of scanning lines on a surface to be scanned using a plurality of light beams.

Conventionally, an imaging device, such as a laser beam printer, a digital copying machine and the like, which forms an image on a surface to be scanned by scanning a beam spot on the surface, is well known.

Recently, a multi-beam scanning device is provided. The multi-beam scanning device is configured such that a plurality of beam spots scan on the surface to be scanned simultaneously using a single polygonal mirror in order to increase an printing speed substantially.

Japanese Patent Provisional Publication No. HEI 8-304722 discloses such type of a multi-beam scanning device. In HEI 8-304722, a beam splitter is used to change optical paths of a plurality of beams emitted by a light source so that the plurality of beams are parallel with each other and that the plurality of beams are closely adjacent to each other. The parallel beams emerged from the beam splitter are then incident on a single polygonal mirror. Since the multi-beam optical device uses the beam splitter, i.e., a relatively expensive optical component, a cost thereof relatively increases Japanese Patent Provisional Publication No. 2000-249948 describes another type of the multi-beam scanning device. In this publication, two light beams impinge on a single polygonal mirror at the nearly same position without using the expensive beam splitter. It should be noted that in the multi-beam scanning device in the publication No. 2000-249948, an angle θ is formed between two beams, which are incident on the polygonal mirror, In a plane perpendicular to a rotational axis of the polygonal mirror.

In the multi-beam scanning device described in the publication No. 2000-249948, scanning angular ranges for the two light beams are different from each other, since the angle θ is formed between two incident beams. As a result, in such a case, curvature of fields and/or scanning speeds for the two light beams become different from each other. If such phenomena occur, scanning lines are not formed properly, and therefore, imaging quality is deteriorated.

In addition, if the angle θ is formed between two beams, which are incident on the single polygonal mirror, it becomes necessary to use a polygonal mirror having a relatively wide reflective coating. That is, it becomes necessary to use a polygonal mirror whose diameter of an inscribed circle is relatively large. In such a case, the multi-beam scanning device requires more expensive motor for rotating the polygonal mirror. Therefore, cost of the multi-beam scanning device increases.

Accordingly, a multi-beam scanning device having a small angle θ formed between the two incident beams is desired. In the multi-beam scanning device described in the publication No. 2000-249948, the angle θ between two incident beams depends on diameters of coupling lenses which are respectively placed on optical paths of the two incident beams, and therefore, the angle θ can not be decreased below a certain value determined by the coupling lenses.

SUMMARY OF THE INVENTION

The present invention is advantageous in that it provides a multi-beam scanning device in which an angle θ formed between beams which are incident on a polygonal mirror is sufficiently small.

According to an aspect of the invention, there is provided a multi-beam scanning device, which includes a first, a secondhand a third light emitting elements which emit a first, a second and a third light beams, respectively, a prism unit through which the first, second and third light beams respectively emitted by said first, said second and said third light emitting element pass, a deflector that deflects the first, the second and the third light beams emerged from said prism unit to scan in a main scanning direction, and an imaging optical system that converges the deflected first, second and third light beams to form beam spots on a surface to be scanned.

In this configuration, the prism unit includes at least two prisms being bonded to each other, a first reflective portion and a second reflective portion being formed on a surface on which said at least two prisms are bonded to each other. The first reflective portion and the second reflective portion respectively reflect the first light beam and the second light beam emitted by said first and second light emitting elements toward said deflector. The prism unit has a gap formed between said first reflective portion and second reflective portion, the third beam emitted by said third light emitting element passing through said gap.

With this configuration, it is possible to reduce each angle θ formed between adjacent two incident beams with respect to the polygonal mirror.

In a particular case, the gap formed between said first reflective portion and said second reflective portion may limit a width of the third beam passing therethrough.

In a particular case, the first reflective portion and said second reflective portion may be formed on the surface on which said at least two prisms are bonded to each other such that a clearance between the first beam and the third beam is substantially zero and a clearance between the second beam and the third beam is substantially zero when the first beam, the second beam and the third beam emerge from the prism unit.

Optionally, the prism unit may include a first prism into which the first beam and the second beam enter, and a second prism into which the third beam enters. In this case, the first reflective portion and said second reflective portion is formed on the surface on which said first prism and said second prism are bonded to each other;

Still optionally, the surface on which said first prism and said second prism are bonded to each other may be a planar surface. In this case, the first beam and the second beam which respectively proceed to said first reflective portion and said second reflective portion are directed such that the first beam and the second beam reflected by said first reflective portion and said second reflective portion are incident on said deflector at nearly the same position as a position at which the third beam is incident on said deflector.

In a particular case, the prism unit may include a first prism into which the first beam enters, and a second prism into which the second beam enters, and a third prism into which the third beam enters, said first prism being bonded to said second prism, said second prism being bonded to said third prism. In this case, the first beam, the second beam and the third beam proceed in the same direction when the first, the second and the third beams are incident on said prism unit. The first reflective portion and the second reflective portion are formed on a surface on which said second prism and said third prism are bonded to each other. The first prism includes a third reflective portion, the first beam which entered said first prism being reflected by said third reflective portion toward said first reflective portion. A fourth reflective portion is formed on a surface on which said first prism and said second prism are bonded to each other, the second beam which entered said second prism being reflected by said fourth reflective portion toward said second reflective portion.

In a particular case, the surface on which said second prism and said third prism may be bonded to each other is a planar surface. In this case, the third reflective portion reflects the first beam such that the first beam reflected by said first reflective portion is incident on said deflector nearly at the same position as a position at which the third beam is incident on said deflector. The fourth reflective portion reflects the second beam such that the second beam reflected by said second reflective portion is incident on said deflector nearly at the same position as a position at which the third beam is incident on said deflector.

Optionally, the multi-beam scanning device may include a slit that is located between said prism unit and said deflector so that said slit limits beam widths of the first beam and the second beam to a width substantially equal to a beam width of the third beam.

Still optionally, the multi-beam scanning device may include two beam spot position adjusting members that respectively adjust positions of beam spots of two of the first beam, the second beam and the third beam on the surface to be scanned in a auxiliary scanning direction which is perpendicular to the main scanning direction, said two beam spot position adjusting members being respectively located on optical paths of said two of the first, the second and the third beams.

Still optionally, each of said two beam spot position adjusting members may include a wedge prism.

In a particular case, one beam which is not adjusted by said two beam spot position adjusting members may first enter a predetermined main scanning range on the surface to be scanned.

Optionally, the multi-beam scanning device may include a supporting member on which said first, said second and said third light emitting elements are mounted. In this case, said first, said second and said third light emitting elements emit the first, the second and the third beam in substantially the same direction.

Still optionally, the prism unit may be mounted on said supporting member.

Still optionally, the multi-beam scanning device may include a first collimating lens, a second collimating lens and a third collimating lens respectively collimating the first, the second and the third beams emitted by said first, said second and said third light emitting elements. In this case, said first, said second and said third light, collimating lenses are mounted on said supporting member.

According to another aspect of the invention, there is provided a multi-beam scanning device, which includes a first, a second and a third light emitting elements which emit a first, a second and a third light beams, respectively, a prism unit through which the first, second and third light beams respectively emitted by said first, said second and said third light emitting element pass, a deflector that deflects the first, the second and the third light beams emerged from said prism unit to scan in a main scanning direction, and an imaging optical system that converges the deflected first, second and third light beams to form beam spots on a surface to be scanned.

In this configuration, the prism unit includes a first prism into which the first beam enters, a second prism into which the second beam enters, and a third prism into which the third beam enters, said third prism being positioned between said first prism and said second prism. The first prism is bonded to said third prism, and said second prism is bonded to said third prism. A first reflective portion is formed on a surface on which said first prism and said third prism are bonded to each other. A second reflective portion is formed on a surface on which said second prism and said third prism are bonded to each other. The first reflective portion and said second reflective portion respectively reflect the first light beam and the second light beam emitted by said first and second light emitting elements toward said deflector. The prism unit has a gap formed between said first reflective portion and second reflective portion, the third beam emitted by said third light emitting element passing through said gap.

With this configuration, it is possible to reduce each angle θ formed between adjacent two incident beams with respect to the polygonal mirror.

In a particular case, the gap formed between said first reflective portion and said second reflective portion may limit a width of the third beam passing therethrough.

In a particular case, the first beam, the second beam and the third beam may be parallel with each other when the first beam, the second beam and the third beam are incident on said prism unit. In this case, the first prism includes a third reflective portion that reflects the first beam incident thereon toward said first reflective portion. The second prism includes a fourth reflective portion that reflects the second beam incident thereon toward said second reflective portion.

Optionally, the multi-beam scanning device may include a slit that is located between said prism unit and said deflector so that said slit limits beam widths of the first beam and the second beam to a width substantially equal to a beam width of the third beam.

Still optionally, the multi-beam scanning device may include two beam spot position adjusting members that respectively adjust positions of beam spots of two of the first beam, the second beam and the third beam on the surface to be scanned in a auxiliary scanning direction which is perpendicular to the main scanning direction, said two beam spot position adjusting members being respectively located on optical paths of said two of the first, the second and the third beams.

In a particular case, each of said two beam spot position adjusting members may include a wedge prism.

In a particular case, one beam which is not adjusted by said two beam spot position adjusting members may first enter a predetermined main scanning range on the surface to be scanned.

Optionally, the multi-beam scanning device may include a supporting member on which said first, said second and said third light emitting elements are mounted. In this case, said first, said second and said third light emitting elements emit the first, the second and the third beam in substantially the same direction.

Still optionally, said prism unit may be mounted on said supporting member.

Still optionally, the multi-beam scanning device may include a first collimating lens, a second collimating lens and a third collimating lens respectively collimating the first, the second and the third beams emitted by said first, said second and said third light emitting elements. In this case, said first, said second and said third light collimating lenses are mounted on said supporting member.

According to another aspect of the invention, there is provided a multi-beam scanning device, which includes a first, a second and a third light emitting elements which emit a first, a second and a third beams, respectively, a prism member through which the third beam passes, a deflector that deflects the first, the second and the third beams emitted by said first, said second and said third light emitting elements to scan in a main scanning direction, and an imaging optical system that converges the deflected first, second and third light beams to form beam spots on a surface to be scanned.

In this configuration, the prism member is placed on an optical path of the third beam between said third light emitting element and said deflector. The prism member includes a first reflective surface which reflects the first beam toward said deflector, and a second reflective surface which reflects the second beam toward said deflector. The prism member has a gap formed between said first reflective surface and second reflective surface, the third beam emitted by said third light emitting element passing through said gap.

With this configuration, it is possible to reduce each angle θ formed between adjacent two incident beams with respect to the polygonal mirror.

In a particular case, said gap formed between said first reflective surface and said second reflective surface may limit a width of the third beam passing therethrough.

In a particular case, the prism member may be positioned such that a deflector side end of said first reflective surface substantially coincides with a portion of a periphery of said first beam, and that a deflector side end of said second reflective surface substantially coincides with a portion of a periphery of said second beam.

Optionally, the prism member may include a first prism into which the first beam and the third beam enter, and a second prism into which the second beam enters, said first prism and said second prism being bonded to each other. In this case, said first prism has said first reflective surface. The second prism has said second reflective surface. The prism member is positioned on an optical path of the third beam such that the third beam passes through said gap.

In a particular case, at least one of said first and said second reflective surfaces may be a total reflecting surface.

In a particular case, the first and the second beams may be adjacent to the third beam when the first beam and the second beam emerge from said prism member.

Optionally, the first, the second and the third beams may be parallel with each other when the first, the second and the third beams are incident on said prism member. In this case, the first prism has a third reflective surface, the first beam which enters the first prism being reflected from said third reflective surface toward said first reflective surface. The second prism has a fourth reflective surface, the second beam which enters said second prism being reflected from said fourth reflective surface toward said second reflective surface.

In a particular case, at least one of said first, said second, said third and said fourth reflective surfaces may be a total reflecting surface.

Optionally, the multi-beam scanning device may include a slit that is located between said prism member and said deflector so that said slit limits beam widths of the first beam and the second beam to a width substantially equal to a beam width of the third beam.

Still optionally, the multi-beam scanning device may include two beam spot position adjusting members that respectively adjust positions of beam spots of two of the first beam, the second beam and the third beam on the surface to be scanned in a auxiliary scanning direction which is perpendicular to the main scanning direction, said two beam spot position adjusting members being respectively located on optical paths of said two of the first, the second and the third beams.

In a particular case, each of said two beam spot position adjusting members may include a wedge prism.

In a particular case, one beam which is not adjusted by said two beam spot position adjusting members may first enter a predetermined main scanning range on the surface to be scanned.

Optionally, the multi-beam scanning device may include a supporting member on which said first, said second and said third light emitting elements are mounted. In this case, the first, said second and said third light emitting elements emit the first, the second and the third beam in substantially the same direction.

In a particular case, the prism member may be mounted on said supporting member.

Optionally, the multi-beam scanning device may include a first collimating lens, a second collimating lens and a third collimating lens respectively collimating the first, the second and the third beams emitted by said first, said second and said third light emitting elements. In this case, said first, said second and said third light collimating lenses are mounted on said supporting member.

According to another aspect of the invention, there is provided a multi-beam scanning device, which includes a first, a second and a third light emitting elements which emit a first beam, a second beam and a third beam, respectively, a member that includes a first surface which is a reflective surface, a deflector that deflects the first, the second and the third beams emitted by said first, said second and said third light emitting elements to scan in a main scanning direction, and an imaging optical system that converges the deflected first, second and third beams to form beam spots on a surface to be scanned.

In this configuration, said member is positioned such that said first surface thereof reflects the third beam toward said deflector, and that edge portions of said member block a portion of the first beam and a portion of the second beam, respectively.

With this configuration, it is possible to reduce each angle θ formed between adjacent two incident beams with respect to the polygonal mirror.

In a particular case, the member may have the form of the triangular prism. In this case, the member has a second surface, an edge portion of said second surface blocking the portion of the first beam and another edge portion of said second surface blocking the portion of the second beam.

Optionally, the multi-beam scanning device may include two beam spot position adjusting members that respectively adjust positions of beam spots of two of the first beam, the second beam and the third beam on the surface to be scanned in a auxiliary scanning direction which is perpendicular to the main scanning direction, said two beam spot position adjusting members being respectively located on optical paths of said two of the first, the second and the third beams.

In a particular case, each of said two beam spot position adjusting members may include a wedge prism.

In a particular case, one beam which is not adjusted by said two beam spot position adjusting members may first enter a predetermined main scanning range on the surface to be scanned.

Optionally, the multi-beam scanning device may include a supporting member on which said first, said second and said third light emitting elements are mounted.

In a particular case, said member may be mounted on said supporting member.

Optionally, the multi-beam scanning device may include a first collimating lens, a second collimating lens and a third collimating lens respectively collimating the first, the second and the third beams emitted by said first, said second and said third light emitting elements. In this case, said first, said second and said third light collimating lenses are mounted on said supporting member.

According to another aspect of the invention, there is provided a light source device, which includes a first, a second and a third light emitting elements which emit a first, a second and a third light beams, respectively, a prism unit through which the first, the second and the third beams respectively emitted by said first, said second and said third light emitting elements pass, and a supporting member on which said first light emitting element, said second light emitting element, said third light emitting element and said prism unit are mounted.

In this configuration, the prism unit includes at least two prisms being bonded to each other, a first reflective portion and a second reflective portion being formed on a surface on which said at least two prisms are bonded to each other. The first reflective portion and said second reflective portion respectively reflect the first beam and the second beam emitted by said first and said second light emitting elements toward a deflector. The prism unit has a gap formed between said first reflective portion and said second reflective portion, the third beam emitted by said third light emitting element passing through said gap.

With this configuration, it is possible to reduce each angle θ formed between adjacent two incident beams with respect to the polygonal mirror. Even if variations of ambient temperature occur, appositional relationship of the components mounted on the supporting member is maintained.

In a particular case, the gap formed between said first reflective portion and said second reflective portion may limit a width of the third beam passing therethrough.

In a particular case, the supporting member may be made of metal.

DETAILED DESCRIPTION OF THE EMBODIMENTS

Hereinafter, embodiments according to the invention are described with reference to the accompanying drawings.

First Embodiment

Figure 1:
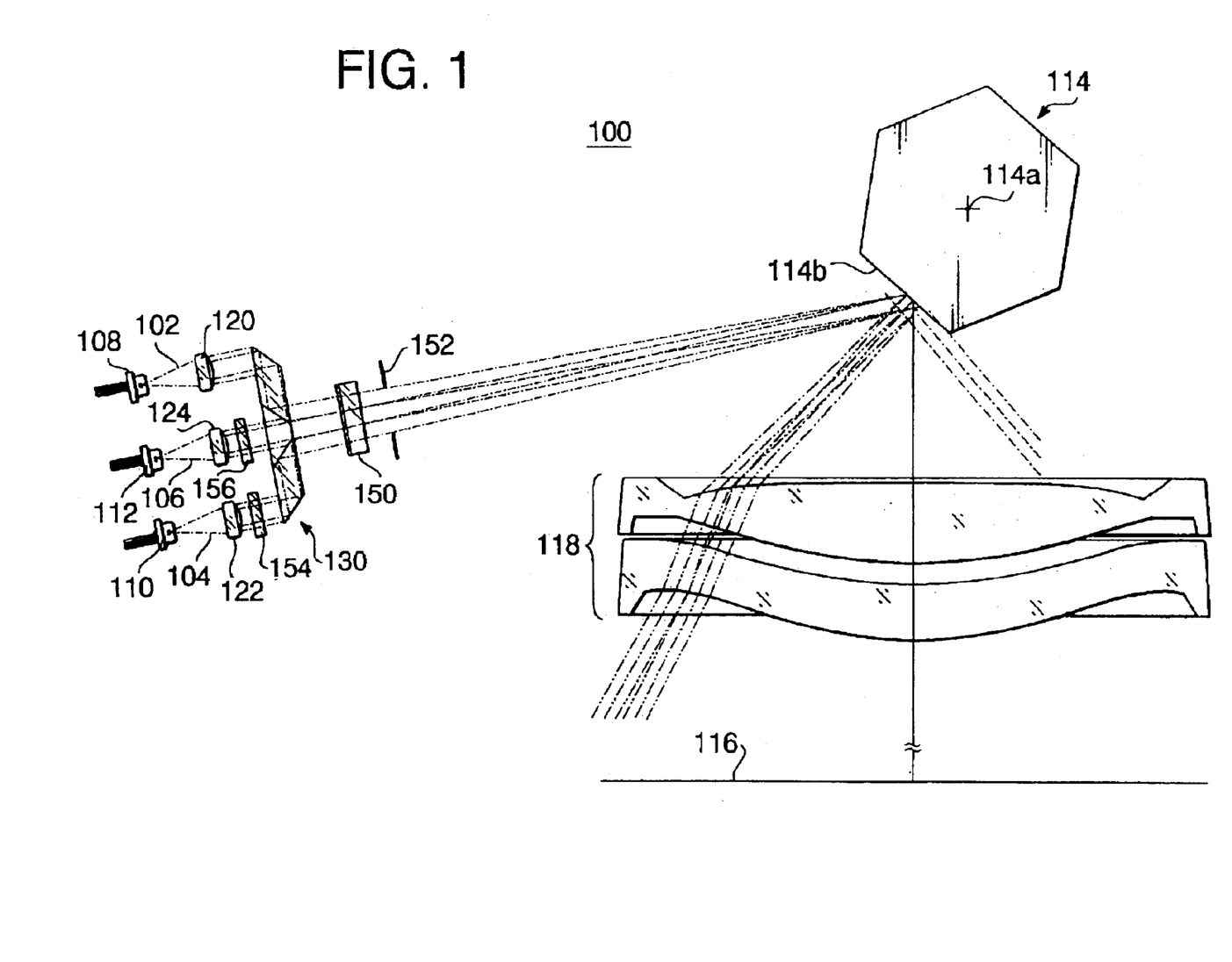
FIG. 1 schematically shows a structure of a multi-beam scanning device according to a first embodiment of the invention.

FIG. 1 schematically shows a structure of a multi-beam scanning device 100 according to a first embodiment of the invention.

The multi-beam scanning device 100 is provided with a laser diode 108, a laser diode 110 and a laser diode 112 which emit a first beam 102, a second beam 104 and a third beam 106, respectively. The three beams 102, 104 and 106 are collimated by three collimating lenses 120, 122 and 124, respectively. It should be noted that the laser diode may be replaced with another type of a light emitting element.

Each of the three beams collimated by the collimating lenses 120, 122 and 124 pass through a prism unit 130, a cylindrical lens 150 which has a positive power only in an auxiliary scanning direction, and a slit 152. The three beams passed through the slit 152 are incident on a reflecting surface 114b of a polygonal mirror 114 which deflects the three beams to scan in a main scanning direction. Each of the three beams deflected by the polygonal mirror 114 passes through an fθ lens 118 which converges the beam on a surface 116 to be scanned to form beam spots scanning in the main scanning direction thereon at a constant speed. As the polygonal mirror 114 rotates about a rotational axis 114a, three scanning lines are formed simultaneously on the surface 116. As described below, the three scanning lines are spaced at predetermined intervals in the auxiliary scanning direction which is perpendicular to the main scanning direction. The auxiliary scanning direction is parallel with the rotational axis 114a.

As shown in FIG. 1, the three laser diodes 108, 110 and 112 are located such that three beams emitted by the three laser diodes proceed in a common plane which is perpendicular to the rotational axis 114a of the polygonal mirror 114, and that three beams emitted by the laser diodes 108, 110 and 112 are parallel with each other.

Due to the refraction power of the cylindrical lens 150, each beam is converged on a plane closely adjacent to the reflection surface 114b of the polygonal mirror 114. The slit 152 defines a cross sectional shape of each effective light beam passing therethrough so that a width of each of the beams emerged from the collimating lenses 120 and 122 substantially coincides with a beam width of the beam emerged from the collimating lens 124.

In the multi-beam scanning device 100, wedge prisms 154 and 156 are provided on optical paths of the beams 104 and 106, respectively. Each of wedge prisms 154 and 156 serves as an beam spot position adjusting member which shifts a beam spot on the surface 116 to be scanned in the auxiliary scanning direction. In this embodiment, by using the wedge prisms 154 and 156, beam spots on the surface 116 respectively corresponding to the three beams 102, 104 and 106 are aligned in the auxiliary scanning direction at the same intervals.

It should be noted that when the polygonal mirror 114 rotates counterclockwise from a position shown in FIG. 1, the beam spot corresponding to the beam 102 firstly enters a predetermined main scanning range on the surface 116. Therefore, positions of beam spots corresponding to the beams 104 and 106 in the auxiliary scanning direction are easily adjusted with reference to a position of the beam spot corresponding to the beam 102.

More specifically, a cross-sectional shape of each of the wedge prisms 154 and 156 has the form of a wedge. By adjusting a position of such a wedge prism, a position of a beam incident on the cylindrical lens 150 in the auxiliary scanning direction can be adjusted. As the position of the beam incident on the cylindrical lens 150 changes in the auxiliary scanning direction, an incident angle of the beam with respect to the reflection surface of the polygonal mirror 114 changes in the auxiliary scanning direction. As a result, the position of the beam spot on the surface 116 changes in the auxiliary scanning direction.

Figure 2:
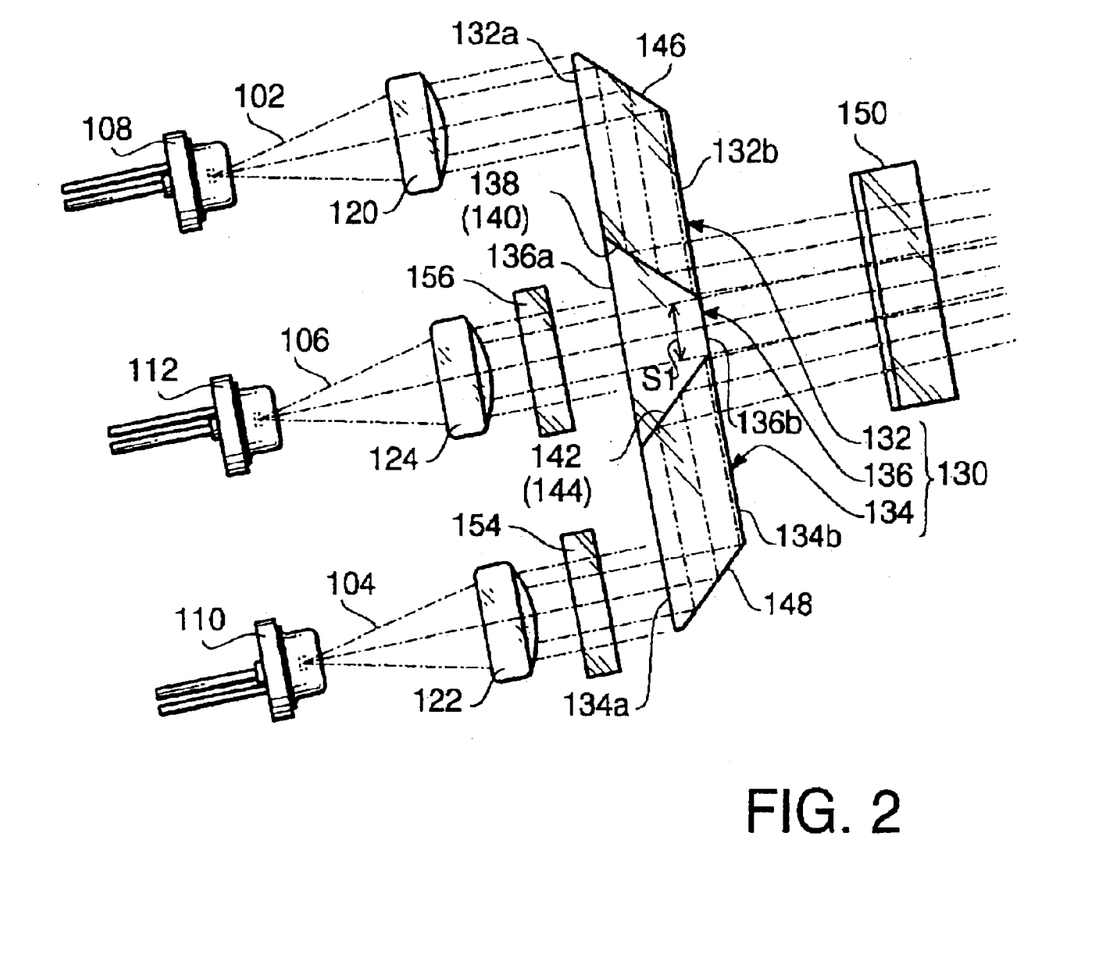
FIG. 2 is an enlarged view of a portion of the multi-beam scanning device including a prism unit.

FIG. 2 is an enlarged view of a portion of the multi-beam scanning device 100 including the prism unit 130. As shown in FIG. 2, the prism unit 130 includes a first prism 132, a second prism 134 and a third prism 136 through which the first beam 102, the second beam 104 and the third beam 106 pass, respectively. The third prism 136 is adhered to the first prism 132 on one surface 138 thereof and is adhered to the second prism 134 on another surface 142 thereof. On the surfaces 138 and 142, a first reflective coating 140 and a second reflective coating 144 are formed, respectively.

On a surface of the first prism 132 opposite to a surface adhered to the third prism 136, a third reflective coating 146 is formed to reflect the first beam 102. Also, on a surface of the second prism 134 opposite to a surface adhered to the third prism 136, a fourth reflective coating 148 is formed to reflect the second beam 104. Each of the four reflective coatings is, for example, a thin layer of metal.

As shown in FIG. 2, a cross-sectional shape of the third prism 136 has the form of a trapezoid. The third prism 136 has a top surface 136b and a bottom surface 136a. A width of the top surface 136b is smaller than a width of the bottom surface 136a. The third beam 106 from the laser diode 112 enters the prism 136 through the bottom surface 136a, emerges from the prism 136 through the top surface 136b, and proceeds toward the polygonal mirror 114, As shown in FIG. 2, the reflective coatings 140 and 144 are respectively formed on side surfaces of the third prism 136 whose cross-sectional shape is a trapezoid, and a gap S1 is formed between these reflective coatings 140 and 144.

The width of the top surface 136b is smaller than the beam width of the third beam 136. That is, the gap S1 is smaller than the beam width of the third beam 136. In this embodiment, the prism unit 130 is placed such that a chief ray of the beam 106 passes through a center position of the top surface 136b of the third prism 136. Therefore, a periphery of the third beam 106 is reflected by the reflective coatings 140 and 144 and a portion of the third beam 106 reflected by the reflective coatings 140 and 144 proceeds in a direction opposite to a direction of the beam proceeding to the polygonal mirror 114. Thus, the beam width of the third beam 106 is limited by the gap S1.

As shown in FIG. 2, the first beam 102 enters the first prism 132 through a front surface 132a and is reflected from the third reflective coating 146 toward the first reflective coating 140. Then, the first beam 102 is reflected by the reflective coating 140, emerges from the prism 132 through a rear surface 132b of the prism 132, and proceeds toward the polygonal mirror 114.

As shown in FIG. 2, the reflective coating 146 reflects the beam 102 such that a portion of the periphery of the beam 102 reflected from the reflective coating 146 impinges on a polygonal mirror 114 side edge of the first reflective coating 140. With this configuration, it becomes possible to place the beam 102 emerged from the prism 132 and the beam 106 emerged from the prism 136 at positions which are extremely adjacent to each other, or that peripheries of the beam 102 emerged from the prism 132 and of the beam 106 emerged from the prism 136 coincide with respect to each other. Accordingly, an angle θ formed between the beams 102 and 106 when the beams are incident on the reflection surface 114b of the polygonal mirror 114 in a plane perpendicular to the rotational axis 114a becomes extremely small.

As shown in FIG. 2, the second beam 104 enters the second prism 134 through a front surface 134a and is reflected from the fourth reflective coating 148 toward the second reflective coating 144. Then, the second beam 104 is reflected by the reflective coating 144, emerges from the prism 134 through a rear surface 134b of the prism 134 and proceeds toward the polygonal mirror 114.

As shown in FIG. 2, the reflective coating 148 reflects the beam 104 such that a portion of the periphery of the beam 104 reflected by the reflective coating 148 impinges on a polygonal mirror 114 side edge of the second reflective coating 144. With this configuration, it becomes possible to place the beam 104 emerged, from the prism 134 and the beam 106 emerged from the prism 136 such that they are extremely adjacent to each other, or that peripheries of the beams 104 and 106 coincide with respect to each other. Accordingly, an angle θ formed between the beams 104 and 106 when the beams are incident on the reflection surface 114b of the polygonal mirror 114 in a plane perpendicular to the rotational axis 114a becomes extremely small.

Further, the prism 132, 134 and 136 of the prism unit 130 are configured such that three beams 102, 104 and 106 emerged from the prism unit 130 are incident on the reflective surface 114b at substantially the same position. Thus, the beams 102 and 104 emerged from the prism unit 130 are inclined with respect to the beam 106 emerged from the prism unit 130.

A light source unit which includes a supporting member on which the laser diodes (108, 110, 112), the collimating lenses (120, 122, 124), the wedge prisms (154, 156), the prism unit 130, the cylindrical lens 150, and the slit 152 are mounted may be provided in the multi-beam scanning device 100. By employing such a light source unit, the multi-beam scanning device 100 can be fabricated relatively easily.

Figure 3A:
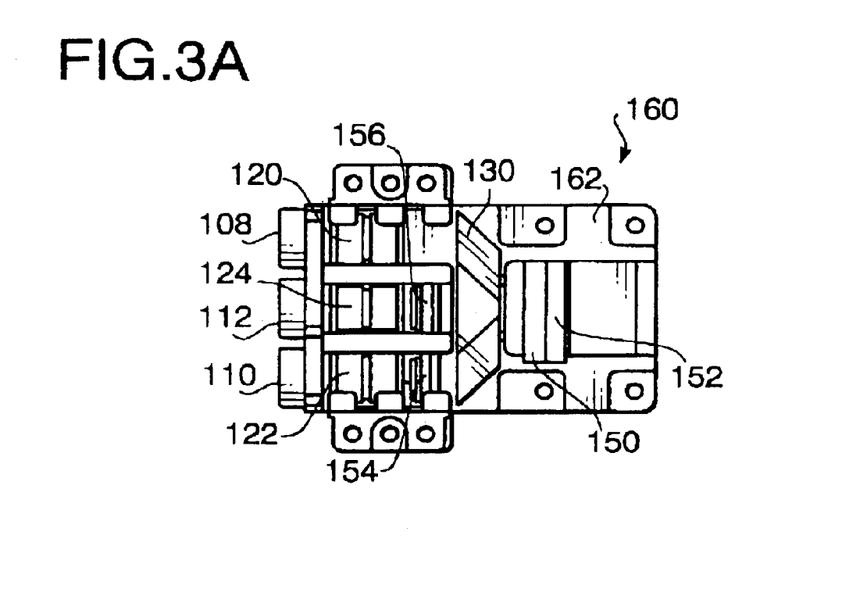
FIG. 3A is a top view of a light source unit according to the first embodiment.
Figure 3B:
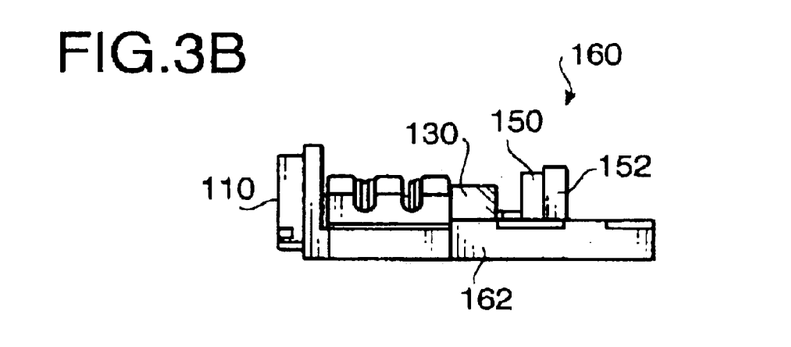
FIG. 3b is a side view of the light source unit.
Figure 3C:
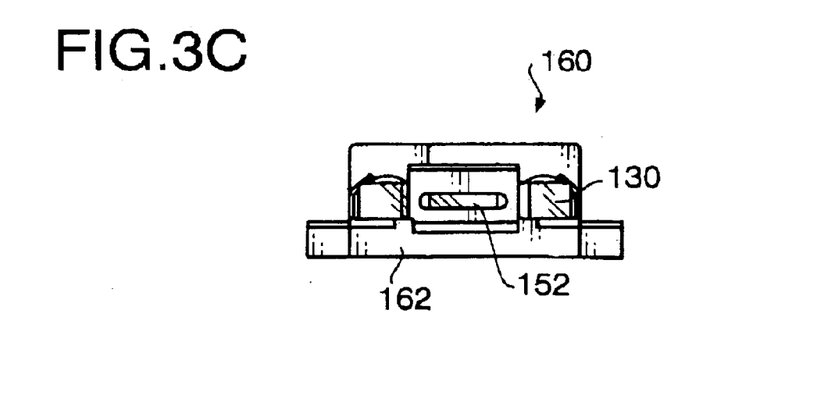
FIG. 3C is a front view of the light source unit.

FIGS. 3A–3C show such a light source unit 160. FIG. 3A is a top view of the light source unit 160. FIG. 3b is a side view of the light source unit 160. FIG. 3C is a front view of the light source unit 160. As shown in FIGS. 3A–3C, the light source unit 160 includes a supporting member 162 on which the laser diodes (108, 110, 112), the collimating lenses (120, 122, 124), the wedge prisms (154, 156), the prism unit 130, the cylindrical lens 150, and the slit 152 are mounted.

The laser diodes 108, 110 and 112 are mounted on the supporting member 162 such that three beams emitted by the laser diodes proceed in a common plane which is perpendicular to the rotational axis 114a of the polygonal mirror 114, and that three beams emitted by these laser diodes are parallel with each other. In this case, it is advantageous in that electrical components for control of the light source unit 160 can be placed together at a rear side of the light source unit 160.

As shown in FIGS. 3A–3C, the laser diodes (108, 110, 112) and the collimating lenses (120, 122, 124) are mounted on a single member (i.e., the supporting member 162). Therefore, even if the thermal expansion (or contraction) of the supporting member 162 occurs due to variations of ambient temperature, positional relationship among three beams emerged from the collimating lenses (120, 122, 124) can be maintained. That is, even though variations of ambient temperature occur, parallelism among these beams (120, 122, 124) can be maintained. Therefore, according to this embodiment, image quality can be maintained.

On the contrary, if the laser diodes (108, 110, 112) and the collimating lenses (120, 122, 124) are mounted on two or more supporting members, positional relationship among these components tends to be deteriorated due to variations of ambient temperature. Since a slight positional error of the beam in the vicinity of the collimating lens can changes a position of the beam spot on the surface 116 significantly, use of the single light source unit 160 in the multi-beam scanning device 100 is very advantageous.

Preferably, the supporting member 162 of the light source unit 160 is made of high-thermal-conductivity material, for example, metal.

If laser diodes which exhibits the phenomenon of mode hopping and whose output wavelengths vary with ambient temperature variations are used as the laser diodes (108, 110, 112), when these laser diodes operate at different ambient temperatures, output wavelengths of these laser diodes may become different from each other. In such a case, a phenomenon of chromatic aberration occurs when these beams pass through the fθ lens. As a result, so-called jitter phenomenon in which a position of the beam spot on the surface to be scanned is shifted from a proper position occurs.

However, in this embodiment, since the supporting member 162 is made of metal having a high-thermal-conductivity, heat-transfer properties among the supporting member 162 and the laser diodes (108, 110, 112) are sufficiently high. As a result, the laser diodes (108, 110, 112) are kept at substantially the same temperature. Therefore, according to the embodiment, it is prevented that the laser diodes (108, 110, 112) operate at different output wavelengths, respectively.

Second Embodiment

Figure 4:
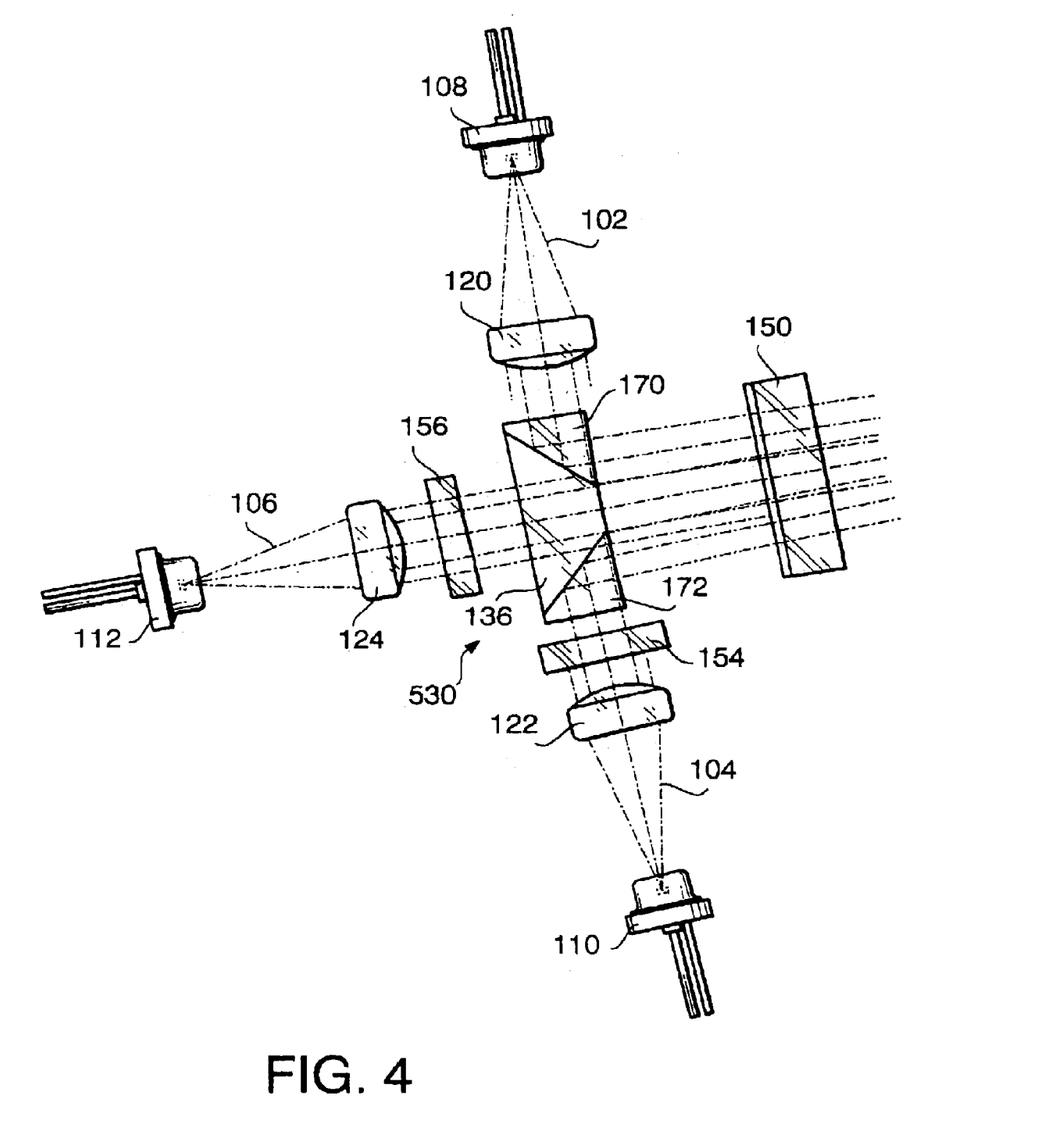
FIG. 4 shows a second embodiment which is a variation as to a configuration from laser diodes to the cylindrical lens in FIG. 2.

FIG. 4 shows a second embodiment which is a variation as to a configuration from laser diodes to the cylindrical lens 150 in FIG. 2. As shown in FIG. 4, a prism unit 530 is used in place of the prism unit 130. Further, the first laser diode 108, the first collimating lens 120, the second laser diode 110, and the second collimating lens 122 are located at positions different from positions in the first embodiment (FIG. 2), respectively.

The prism unit 530 includes a first prism 170, a second prism 172 and the third prism 136. The first prism 170 and the second prism 172, each of which has the form of a triangular prism, are different from the first prism 132 and the second prism 134 in FIG. 2, respectively.

The prism 170 can be fabricated by cutting out a portion of the prism 132 including the reflective coating 146. Also, the prism 172 can be fabricated by cutting out a portion of the prism 134 including the reflective coating 148.

In FIG. 4, the first laser diode 108 and the first collimating lens 120 are located such that the beam 102 is emerged from the collimating lens 120 to a direction perpendicular to a direction of the beam 106. Also, the second laser diode 110 and the second collimating lens 122 are located such that the beam 104 is emerged from the collimating lens 122 to a direction perpendicular to a direction of the beam 106.

According to the second embodiment, by using the prism 530, positions of the laser diodes and collimating lenses can be changed with respect to the first embodiment.

Third Embodiment

Figure 5:
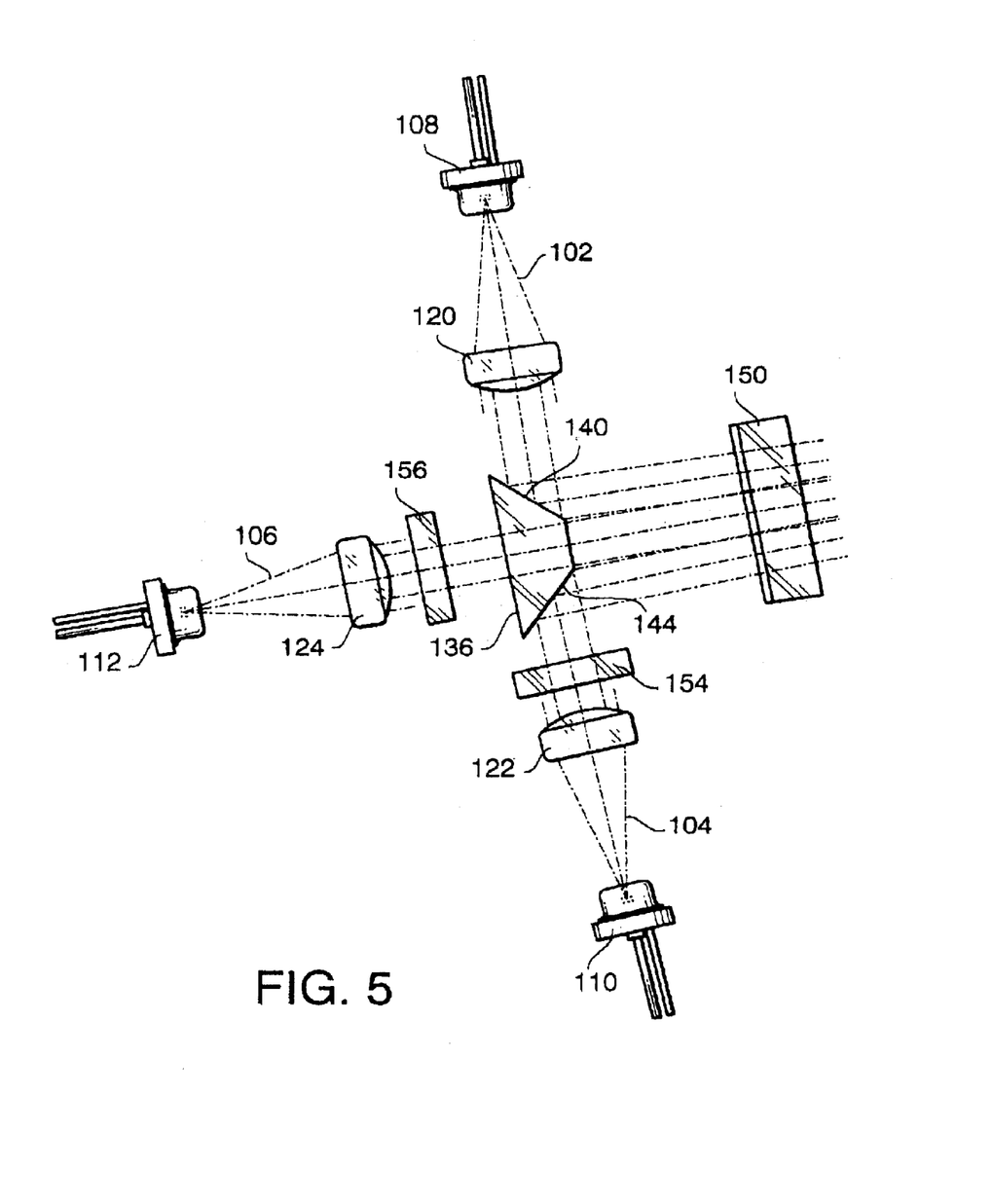
FIG. 5 shows a third embodiment which is a variation as to a configuration from laser diodes to the cylindrical lens in FIG. 4.

FIG. 5 shows a third embodiment which is a variation as to a configuration from laser diodes to the cylindrical lens 150 in FIG. 4. As shown in FIG. 5, only the third prism 136 is used in place of the prism unit 530. That is, in the third embodiment, the first prism 170 and the second prism 172 are omitted.

As shown in FIG. 5 the beam 102 is directly incident on the reflective coating 140 formed on a surface of the prism 136. Also, the beam 104 is directly incident on the reflective coating 144 formed on a surface of the prism 136.

It should be appreciated that since the number of prisms can be decreased according to the third embodiment, cost of the multi-beam scanning device 100 can be reduced. It should be noted that, slits may be located between the corresponding collimating lenses and the prism 136 so as to limit the beam width of the corresponding beams.

Fourth Embodiment

Figure 6:
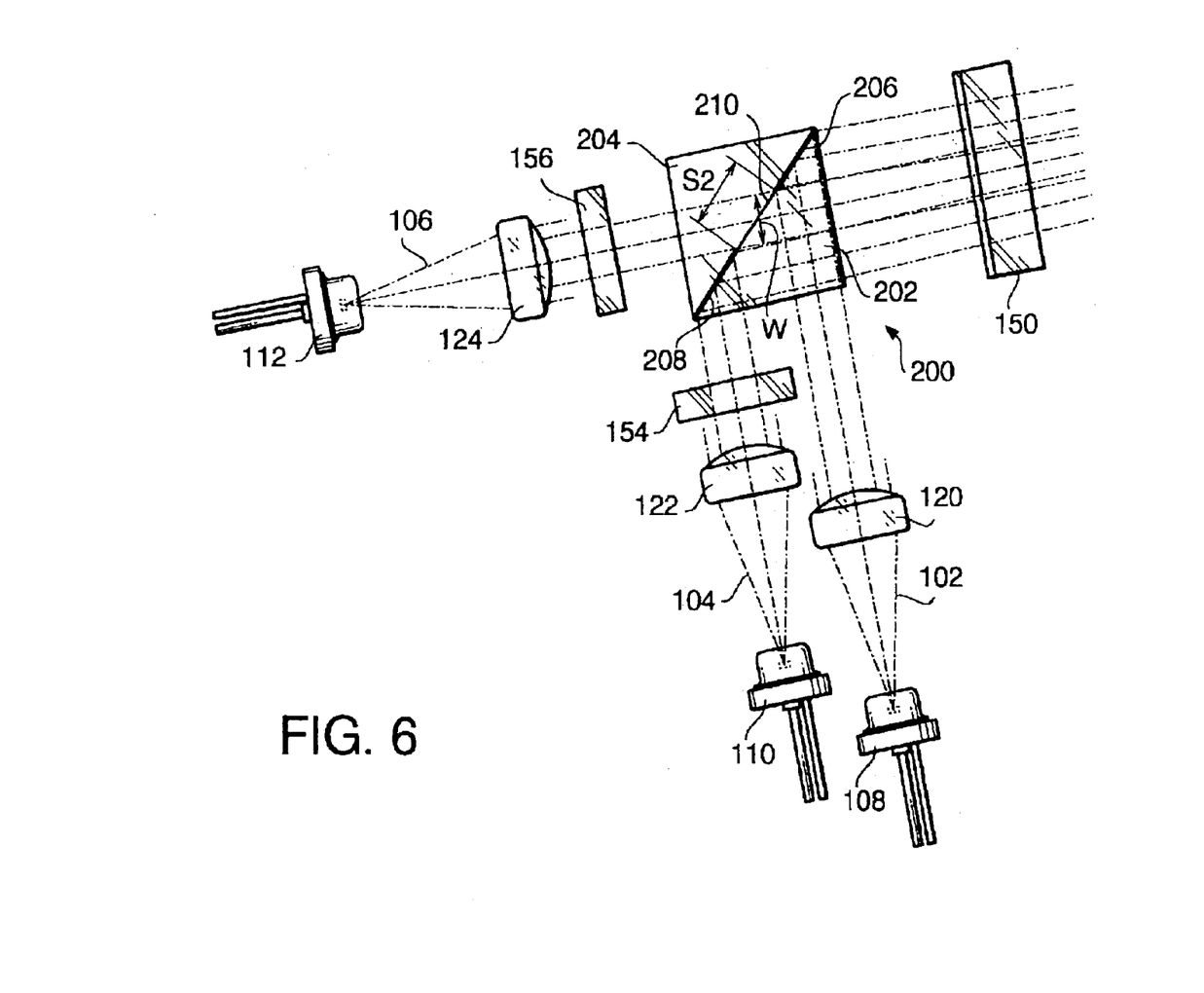
FIG. 6 shows a fourth embodiment which is a variation as to a configuration from laser diodes to the cylindrical lens in FIG. 2.

FIG. 6 shows a fourth embodiment which is a variation as to a configuration from laser diodes to the cylindrical lens 150 in FIG. 2. As shown in FIG. 6, a prism unit 200 is used in place of the prism unit 130. Further, laser diodes, the collimating lenses and the wedge prisms are located at positions different from positions in the first embodiment (FIG. 2).

The prism unit 200 includes a first prism 202 to which the first beam 102 and the second beam 104 enter, and a second prism 204 to which the third beam 106 enters. The prism unit 200 is fabricated by bonding two prisms 202 and 204 together.

The prism unit 200 further includes a first reflective coating 206 which reflects the incident beam 102 to the polygonal mirror 114, and a second reflective coating 208 which reflects the incident beam 104 to the polygonal mirror 114. As shown in FIG. 6, the reflective coatings 206 and 208 are formed on a common surface 210 on which two prisms 202 and 204 are bonded together. Further, a spacing S2 is formed between the reflective coatings 206 and 208.

The prism unit 200 is positioned such that the beam 106 is incident on the surface 210 with being inclined with respect to the surface 210. Further, the prism unit 200 is positioned on an optical path of the beam 106 such that the beam 106 passes through the spacing S2 between the reflective coatings 206 and 208. Preferably, a chief ray of the beam 106 passes through a center position of the spacing S2.

The spacing S2 has a width W in a direction perpendicular to the beam 106. In addition, the width W is smaller than the beam width of the beam 106. Therefore, a periphery of the beam 106 is reflected by the reflective coatings 206 and 208, and proceeds opposite to a direction of the beam proceeding to the polygonal mirror 114. Thus, the beam width of the third beam 106 is limited to the width W by the spacing S2.

The first laser diode 108 and the first collimating lens 120 are located such that the beam 102 is emerged from the collimating lens 120 to a direction perpendicular to the beam 106. Also, the second laser diode 110 and the second collimating lens 122 are located such that the beam 104 is emerged from the collimating lens 122 to a direction perpendicular the beam 106.

The beam 102 incident on the reflective coating 206 and the beam 104 incident on the reflective coating 208 are reflected toward the polygonal mirror 114, and are emerged from the prism unit 200 at positions closely adjacent to the beam 106 emerging from the prism unit 200.

Furthermore, the first laser diode 108 and the first collimating lens 120 are located such that the periphery of the beam 102 passes through the spacing S2. Also, the second laser diode 110 and the second collimating lens 122 are located such that the periphery of the beam 104 passes through the spacing S2. In this case, the beam 102 irradiates the entire region of the reflective coating 206, and the beam 104 irradiates the entire region of the reflective coating 208. With this configuration, it becomes possible to place the beams 102 and 104 emerged from the prism unit 200 such that they are respectively extremely adjacent to the beam 106 emerged from the prism unit 200.

Further, incident angles of the beams 102 and 104 with respect to the surface 210 is determined such that three beams 102, 104 and 106 emerged from the prism unit 200 are incident on the reflective surface 114b at substantially the same position. That is, the beams 102 and 104 emerged from the prism unit 200 are inclined toward the beam 106 emerged from the prism unit 200.

Fifth Embodiment

Figure 7:
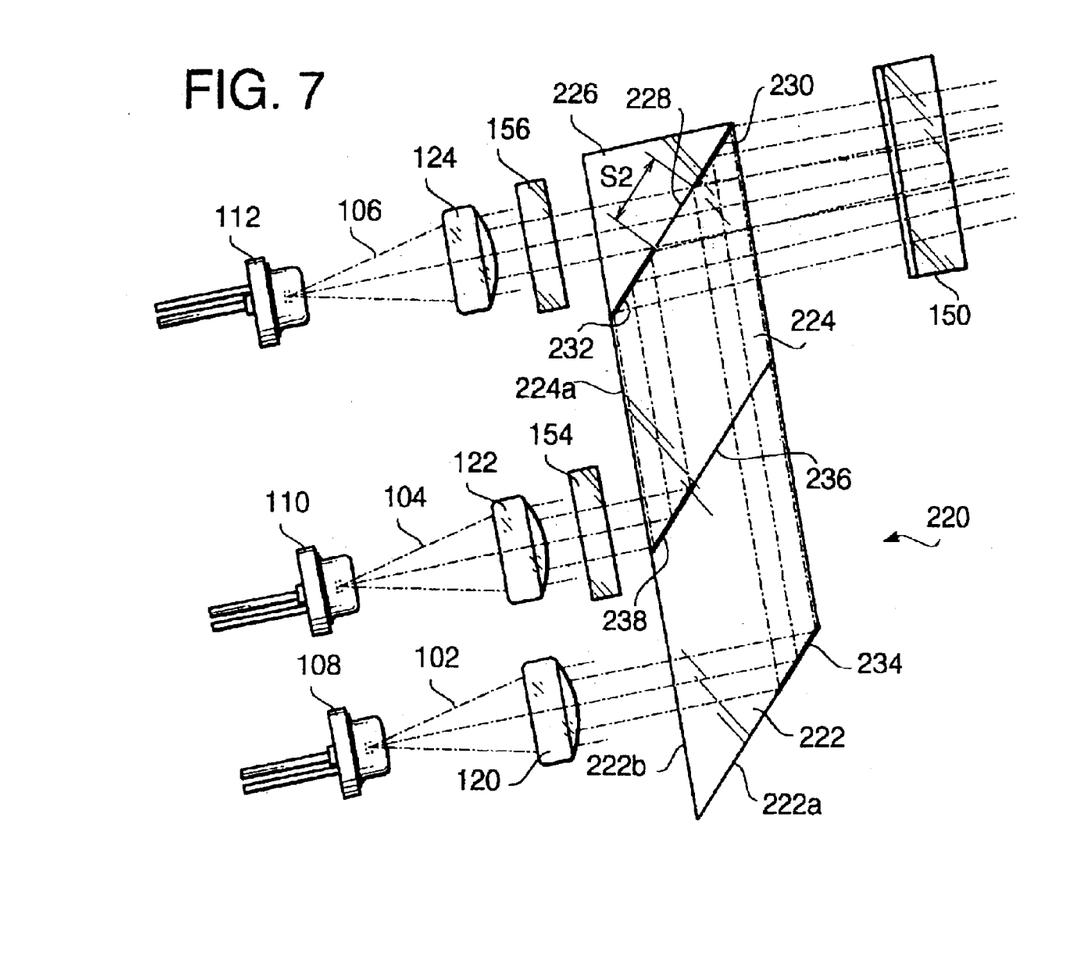
FIG. 7 shows a fifth embodiment which is a variation as to the configuration from laser diodes to the cylindrical lens 150 in FIG. 2.

FIG. 7 shows a fifth embodiment which is a variation as to the configuration from laser diodes to the cylindrical lens 150 in FIG. 2. As shown in FIG. 7, a prism unit 220 is used in place of the prism unit 130. Further, laser diodes, the collimating lenses and the wedge prisms are located at positions different from positions in the first embodiment (FIG. 2).

The laser diodes (108, 110, 112) and the collimating lenses (120, 122, 124) are located such that three beams emitted by these laser diodes proceed in a common plane which is perpendicular to the rotational axis 114a of the polygonal mirror 114, and that these beams are parallel with each other.

The prism unit 220 includes a first prism 222 to which the first beam 102 enters, a second prism 224 to which the second beam 104 enters, and a third prism 226 to which the third beam 106 enters. The prism unit 220 is fabricated by bonding the prisms 222 and 226 to the prism 224, respectively.

As shown in FIG. 7, a first reflective coating 230 and a second reflective coating 232 are formed on a surface of the prism 224 facing to the prism 226. Thus, these reflective coatings 230 and 232 are formed on a common surface 228 on which the prisms 224 and 226 are bonded together.

Similar to the reflective coatings 206 and 208 formed on the surface 210 shown in FIG. 6, a spacing S2 is formed between the reflective coatings 230 and 232. The prism unit 220 is positioned on an optical path of the beam 106 such that the beam 106 passes through the spacing S2 between the reflective coatings 230 and 232. Thus, the beam width of the third beam 106 is limited to a certain width by the spacing S2.

The prism unit 220 further includes a reflective coating 234 formed on a surface 222a opposite to a surface being bonded to the prism 224. The reflective coating 234 reflects the incident beam 102 toward the first reflective coating 230.

The prism unit 220 further includes a reflective coating 238 formed on a surface 236 on which the prisms 222 and 224 are bonded together. The reflective coating 238 reflects the incident beam 104 toward the second reflective coating 232.

The first beam 102 enters the prism 222 through a front surface 222b of the prism 222, and is reflected by the reflective coating 234. Then, as in the case of the fourth embodiment (FIG. 6), the beam 102 is reflected by the reflective coating 230 toward the polygonal mirror 114.

The second beam 104 enters the prism 224 through a front surface 224a of the prism 224, and is reflected by the reflective coating 238. Then, as in the case of the fourth embodiment, the beam 104 is reflected by the reflective coating 232 toward the polygonal mirror 114.

Further, in this embodiment, a direction of the surface 228 (i.e., each direction of the reflective coatings 230 and 232) is determined such that the beams 102 and 104 emerged from the prism unit 220 are incident on the reflective surface 114b at substantially the same position.

Sixth Embodiment

Figure 8:
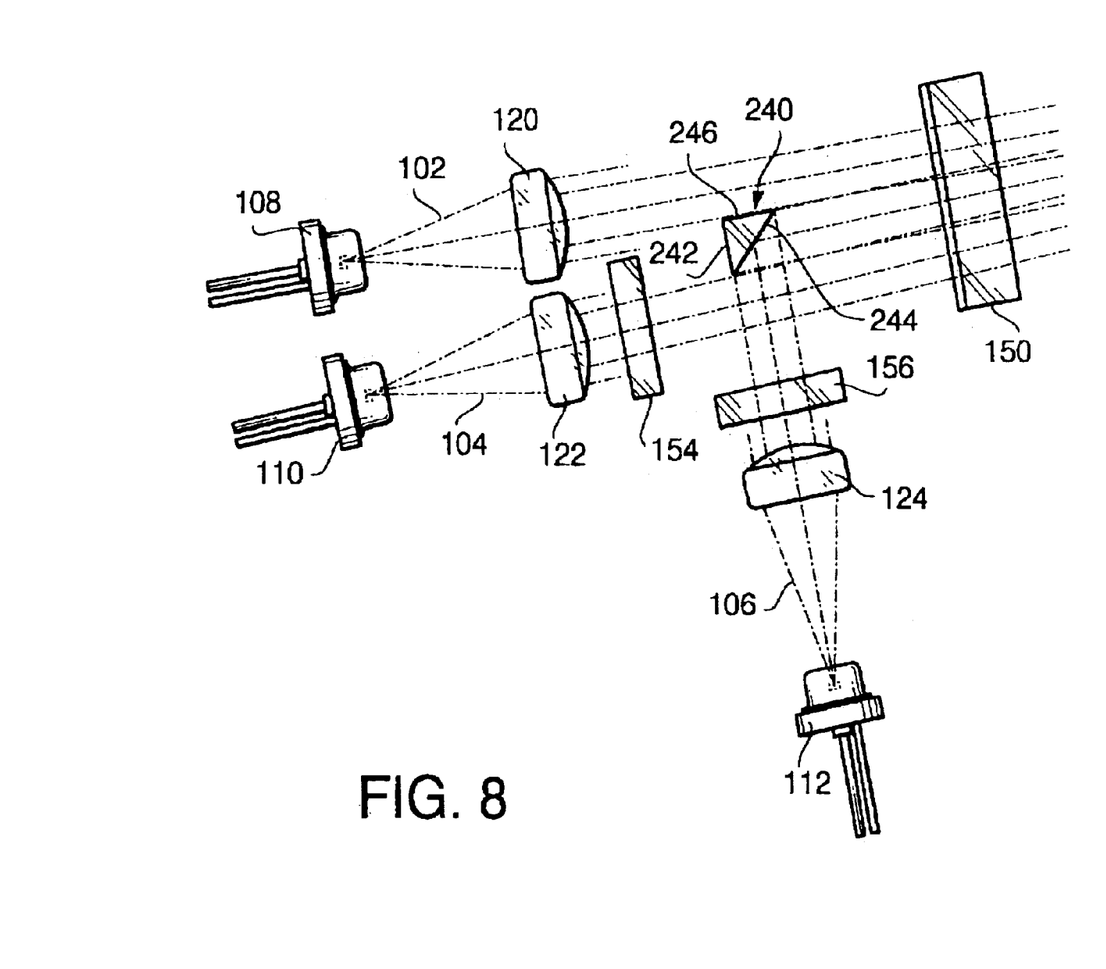
FIG. 8 shows a sixth embodiment which is a variation as to the configuration from laser diodes to the cylindrical lens 150 in FIG. 2.

FIG. 8 shows a sixth embodiment which is a variation as to the configuration from laser diodes to the cylindrical lens 150 in FIG. 2. As shown in FIG. 8, in the sixth embodiment a reflector 240 is used. Further, laser diodes, the collimating lenses and the wedge prisms are located at positions different from positions in the first embodiment (FIG. 2).

The laser diodes (108, 110, 112) and the collimating lenses (120, 122, 124) are located such that three beams emitted by these laser diodes proceed in a common plane which is perpendicular to the rotational axis 114a of the polygonal mirror 114. Further, the laser diodes 108 and 110 and the collimating lenses 120 and 122 are positioned such that these beams 102 and 104 are incident on the reflective surface 114b at substantially the same position. The laser diode 112 and the collimating lens 124 are positioned such that the beams 106 proceeds to a direction substantially perpendicular to the beams 102 and 104.

As shown in FIG. 8, the reflector 240 is located between the beams 102 and 104. For example, the reflector 240 has the form of a triangular prism. Preferably, the reflector 240 has the form of a regular triangular prism. The reflector 240 includes a reflective surface 242, and a reflective surface 244 which corresponds to a hypotenuse.

End portions of the reflective surface 242 are located in portions of the light beams 102 and 104, respectively. Therefore, a portion of the beam 102 incident on the reflective surface 242 and a portion of the beam 104 incident on the reflective surface 242 are reflected by the reflective surface 242 and proceed opposite to a direction of the beam proceeding to the polygonal mirror 114. That is, the reflector 240 serves as a light shield to limit the beam widths of the beams 102 and 104.

Further, the reflective surface 244 is located on, an optical path of the beam 106. The beam 106 emerged from the collimating lens 124 is reflected by the reflective surface 244, and is incident on the reflective surface 114b at the same position as the beams 102 and 104.

As shown in FIG. 8, a third surface 246 of the reflector 240 is directed parallel with the beam 106 toward to the polygonal mirror 114. Further, the third beam 106 irradiates the entire region of the reflective surface 244 of the reflector 240. With this configuration, it becomes possible to place the beams 102 and 104 proceeding to the polygonal mirror 114 such that these beams 102 and 104 are respectively extremely adjacent to the beam 106 proceeding to the polygonal mirror 114, or that peripheries of the beams 102 and 104 coincide with the periphery of the beam 106, respectively.

Seventh Embodiment

Figure 9:
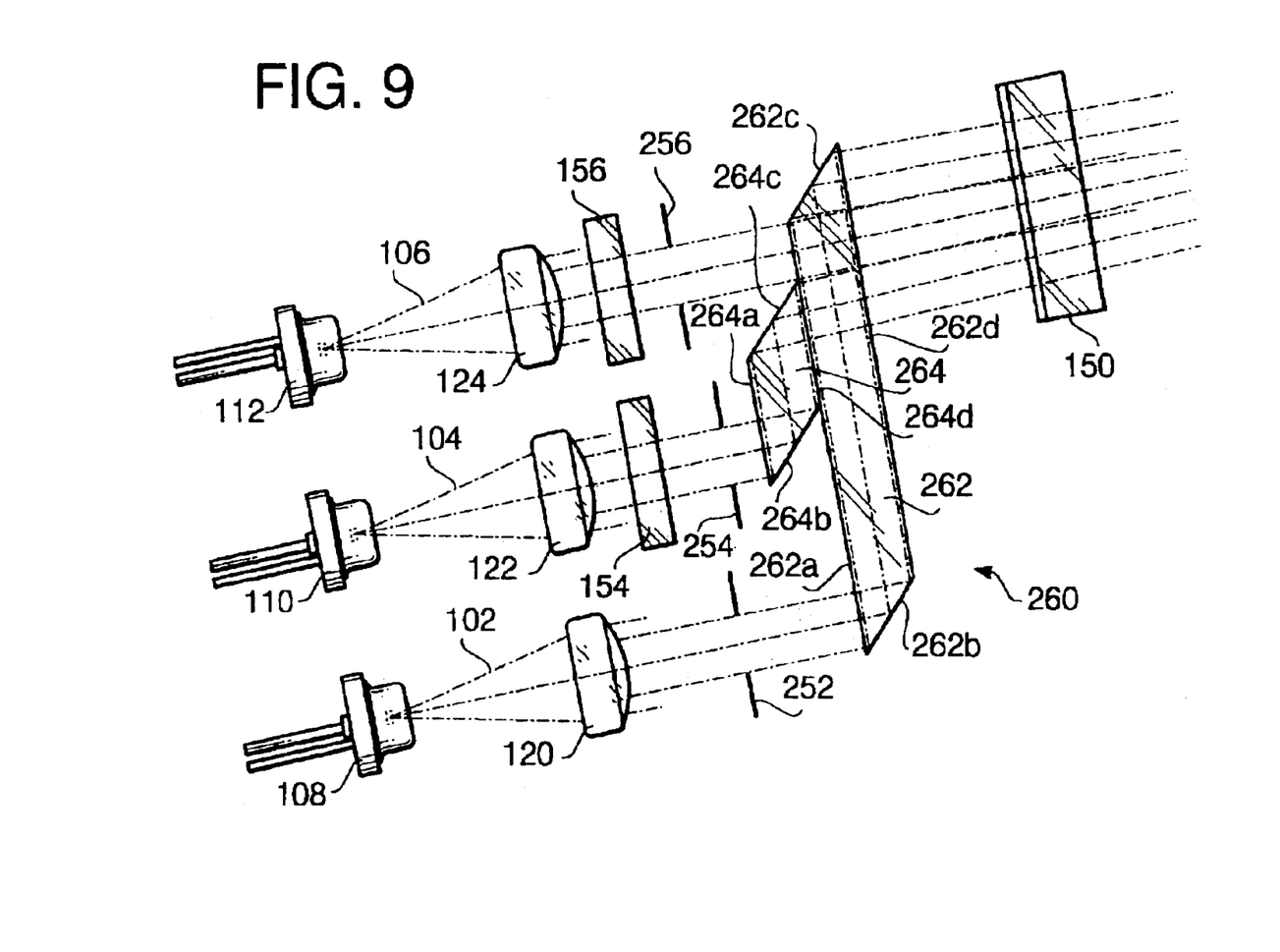
FIG. 9 shows a seventh embodiment which is a variation as to the configuration from laser diodes to the cylindrical lens in FIG. 2.

FIG. 9 shows a seventh embodiment which is a variation as to the configuration from laser diodes to the cylindrical lens 150 in FIG. 2. As shown in FIG. 9, a prism unit 260 is used in place of the prism unit 130. Further, laser diodes, the collimating lenses and the wedge prisms are located at positions different from positions in the first embodiment (FIG. 2).

The laser diodes (108, 110, 112) and the collimating lenses (120, 122, 124) are located such that three beams emitted by these laser diodes proceed in a common plane which is perpendicular to the rotational axis 114a of the polygonal mirror 114, and that these beams are parallel with each other.

Further, slits 252, 254 and 256 for respectively limiting the beam widths of the beams 102, 104 and 106 are provided on the laser diode side from the prism unit 260.

The prism unit 260 includes a first prism 262 and a second prism 264. The first prism 262 includes a surface 262a through which the beams 102 and 106 pass. Further, length of the surface 262a is set substantially equal to a distance between the beams 102 and 106 so that the beams 102 and 106 are respectively incident on end portions of the surface 262a. In this embodiment shown in FIG. 9, the beam 102 is incident on the surface 262a at a surface 262b side end portion of the surface 262a, and the beam 106 is incident on the surface 262a at the surface 262c side end portion of the surface 262a. In this embodiment, the surface 262b, the surface 262c, a surface 264b and a surface 264c are total reflecting surfaces.

The beam 106 which entered the prism 262 through the surface 262a emerges from the surface 262d without being reflected by inner surfaces of the prism 262. The beams 102 which entered the prism 262 through the surface 262a is reflected from the surface 262b and the surface 262c successively, and then emerges from the surface 262d. The prism 262 is configured such that the beams 102 and 106 emerged from the surface 262d are incident on the reflective surface 114b of the polygonal mirror 114 at substantially the same position.

As described above, since the beam 106 is incident on the surface 262a at the end portion of the surface 262a adjacent to the surface 262c, the beam 106 emerges from a portion of the surface 262d adjacent to a portion through which the beam 102 reflected by the surface 262c passes. With this configuration, it becomes possible to place the beams 102 and 106 proceeding to the polygonal mirror 114 such that these beams 102 and 106 are extremely adjacent to each other, or that peripheries of the beams 102 and 106 coincide with each other.

The second prism 264 includes a surface 264a to which the beam 104 enters, and a surface 264d from which the beam 104 emerges. The beam 104 which entered the prism 264 through the surface 264a is reflected from the surface 264b and the surface 264c successively, and then emerges from the surface 264d. Further, the prism 264 is configured such that the beam 104 emerged from the surface 264d is incident on the reflective surface 114b of the polygonal mirror 114 at substantially the same position as the beams 102 and 106.

The surface 264d of the prism 264 is bonded to the surface 262a of the prism 262 such that the surface 264d of the prism 264 is located closely adjacent to the beam 106 but does not interferes with the beam 106. Further, the beam 104 emerged from the prism 264 enters the prism 262 and emerges from the prism 262 without being reflected by inner surfaces of the prism 262. As a result, the beam 104 emerges from the surface 262d at a position adjacent to the beam 106.

The beam 104 emerges from the surface 262d of the prism 262 at a position which is closely adjacent to the beam 106. Therefore, the beams 102 and 104 emerged from the surface 262d of the prism 262 are placed on opposite sides of the beam 106 emerged from the surface 262d of the prism 262. With this configuration, it becomes possible to place the beams 104 and 106 proceeding to the polygonal mirror 114 such that these beams 104 and 106 are extremely adjacent to each other, or that peripheries of the beams 104 and 106 overlap each other.

Since each of the reflective surfaces of the prism unit 260 is total reflecting surfaces, it is unnecessary for the prism unit 260 to include reflective coatings. Therefore, the prism unit 260 can be fabricated at relatively low cost, and the cost of the multi-beam scanning optical device 100 can be reduced.

As described above, according to the invention, it is possible to reduce each angle formed between adjacent two incident beams with respect to the polygonal mirror. As result, differences of aberration among the three beams are reduced. Further, the diameter of the inscribed circle for polygonal mirror can be decreased.

The present disclosure relates to the subject matter contained in Japanese Patent Application No. 2002-098350, filed on Apr. 1, 2002, which is expressly incorporated herein by reference in its entirety,

What is claimed is:

1. A multi-beam scanning device, comprising:
    a first, a second and a third light emitting elements which emit a first, a second and a third light beams, respectively;
    a prism unit through which the first, second and third light beams respectively emitted by said first, said second and said third light emitting element pass;
    a deflector that deflects the first, the second and the third light beams emerged from said prism unit to scan in a main scanning direction; and
    an imaging optical system that converges the deflected first, second and third light beams to form beam spots on a surface to be scanned,
    wherein said prism unit includes a first prism into which the first beam enters, a second prism into which the second beam enters, and a third prism into which the third beam enters, said third prism being positioned between said first prism and said second prism,
    wherein said first prism being bonded to said third prism, and said second prism being bonded to said third prism,
    wherein a first reflective portion being formed on a surface on which said first prism and said third prism are bonded to each other,
    wherein a second reflective portion being formed on a surface on which said second prism and said third prism are bonded to each other,
    wherein said first reflective portion and said second reflective portion respectively reflect the first light beam and the second light beam emitted by said first and second light emitting elements toward said deflector,
    wherein said prism unit has a gap formed between said first reflective portion and second reflective portion, the third beam emitted by said third light emitting element passing through said gap.

2. The multi-beam scanning device according to claim 1, wherein said gap formed between said first reflective portion and said second reflective portion limits a width of the third beam passing therethrough.

3. The multi-beam scanning device according to claim 1,
    wherein the first beam, the second beam and the third beam are parallel with each other when the first beam, the second beam and the third beam are incident on said prism unit,
    wherein said first prism includes a third reflective portion that reflects the first beam incident thereon toward said first reflective portion,
    wherein said second prism includes a fourth reflective portion that reflects the second beam incident thereon toward said second reflective portion.

4. The multi-beam scanning device according to claim 1, further comprising a slit that is located between said prism unit and said deflector so that said slit limits beam widths of the first beam and the second beam to a width substantially equal to a beam width of the third beam.

5. The multi-beam scanning device according to claim 1, further comprising two beam spot position adjusting members that respectively adjust positions of beam spots of two of the first beam, the second beam and the third beam on the surface to be scanned in a auxiliary scanning direction which is perpendicular to the main scanning direction, said two beam spot position adjusting members being respectively located on optical paths of said two of the first, the second and the third beams.

6. The multi-beam scanning device according to claim 5, wherein each of said two beam spot position adjusting members includes a wedge prism.

7. The multi-beam scanning device according to claim 5, wherein one beam which is not adjusted by said two beam spot position adjusting members first enters a predetermined main scanning range on the surface to be scanned.

8. The multi-beam scanning device according to claim 1, further comprising a supporting member on which said first, said second and said third light emitting elements are mounted, wherein said first, said second and said third light emitting elements emit the first, the second and the third beam in substantially the same direction.

9. The multi-beam scanning device according to claim 8, wherein said prism unit is mounted on said supporting member.

10. The multi-beam scanning device according to claim 8, further comprising a first collimating lens, a second collimating lens and a third collimating lens respectively collimating the first, the second and the third beams emitted by said first, said second and said third light emitting elements, wherein said first, said second and said third light collimating lenses are mounted on said supporting member.

* * * * *